United States Patent [19]

Angehrn

[11] Patent Number: 4,847,814

[45] Date of Patent: Jul. 11, 1989

[54] THREE-DIMENSIONAL BOREHOLE TELEVIEWER DISPLAY

[75] Inventor: Jorg A. Angehrn, Brea, Calif.

[73] Assignee: Chevron Research Company, San Francisco, Calif.

[21] Appl. No.: 10,370

[22] Filed: Feb. 3, 1987

[51] Int. Cl.$^4$ ............................................... G01V 1/40
[52] U.S. Cl. ........................................ 367/72; 367/69
[58] Field of Search .............................. 367/68, 69, 72

[56] References Cited

U.S. PATENT DOCUMENTS 3,434,568  3/1969  Caldwell ............................... 367/25
4,633,448  12/1986  Koeijmans ............................ 367/72

OTHER PUBLICATIONS

"Interpretation and Application of Borehole Televiewer Surveys", Taylor, T. J., SPWLA 24th Logging Symposium, Jun. 1983.
"Development of a New Borehole Acoustic Televiewer...", Moore et al., Transactions, vol. 9, Part II, Aug. 1985.

Primary Examiner—Thomas H. Tarcza
Assistant Examiner—Ian J. Lobo
Attorney, Agent, or Firm—S. R. LaPaglia; E. J. Keeling; E. A. Schaal

[57] ABSTRACT

A system is disclosed for creating a three-dimensional image of data obtained from scanning a borehole wall with an acoustic transducer. Each scan produces an orientation pulse and a series of signals, including a fire pulse and echo signals. The system uses the transit times of the echo signals to modulate the geometry of the three-dimensional image, and uses the amplitudes of the echo signals to control the gray scale shading of the image. In one embodiment, a counting means keeps track of the angular position of the transducer, a ramp generating means produces a ramp voltage proportional to the elapsed time since the fire pulse, a sine table means and a sine conversion means produce a sine signal porportional in amplitude to the ramp voltage, a cosine table means and a cosine conversion means produce a cosine signal proportional in amplitude to the ramp voltage, and a monitoring means displays points on the monitoring means when the echo signals are received. The points are moved radially from the center of a circle in a direction controlled by the sine and cosine signals, and the intensities of the points are proportional to the amplitudes of the echo signals.

8 Claims, 5 Drawing Sheets

2-D Amplitude Image
Dark - Weak Signal
Light - Strong Signal
2-D Time Image
Dark - Far
Light - Near
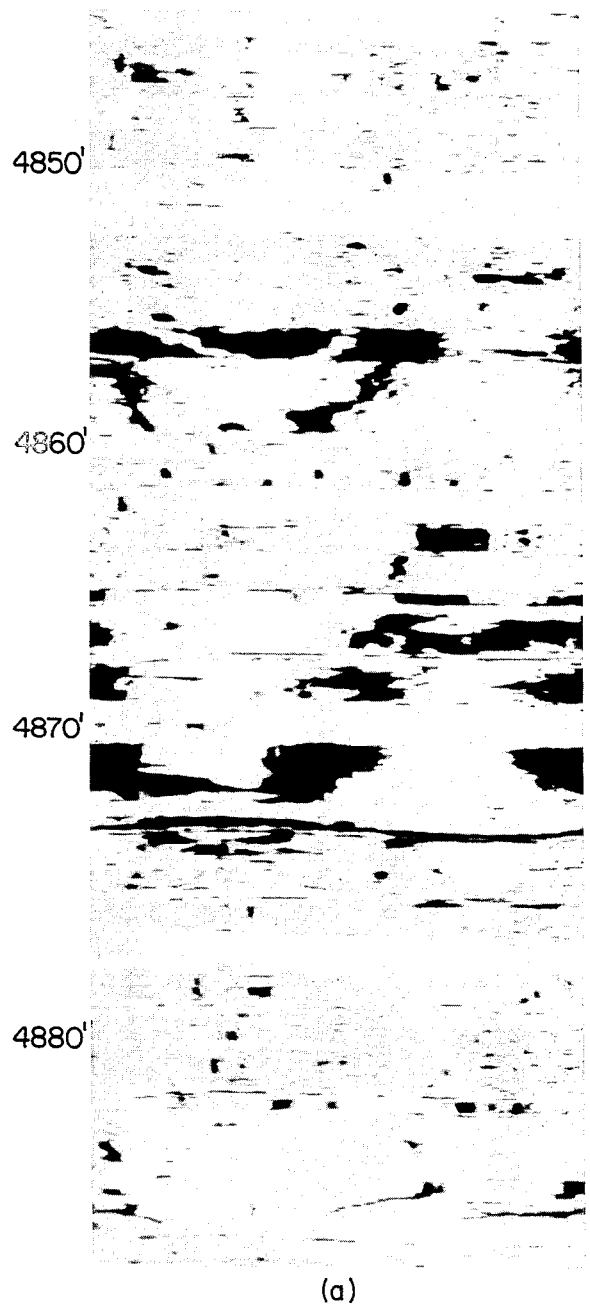
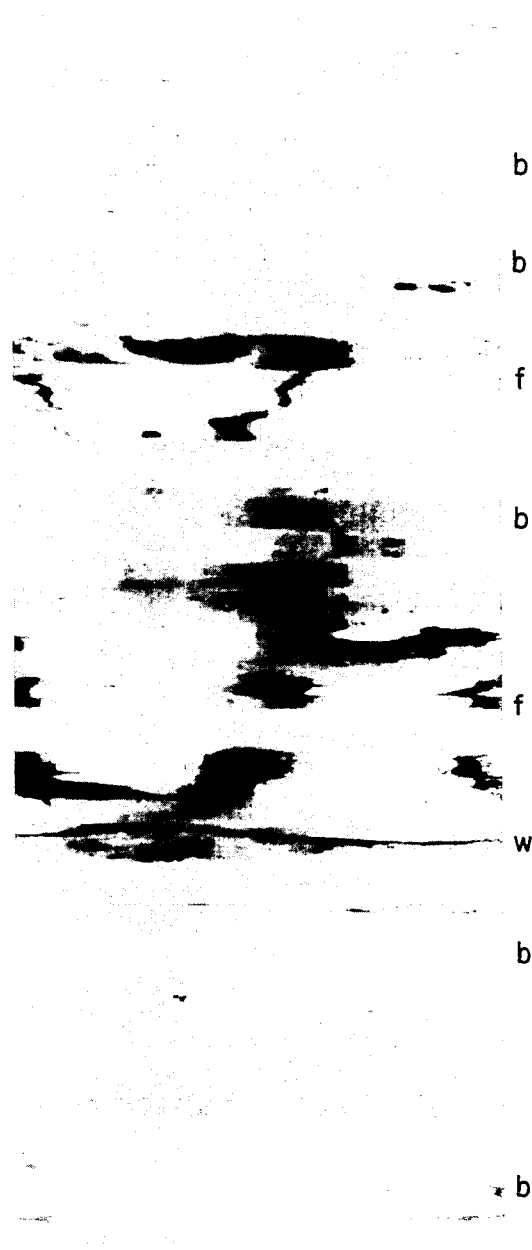
(a) (b)
FIG._1.

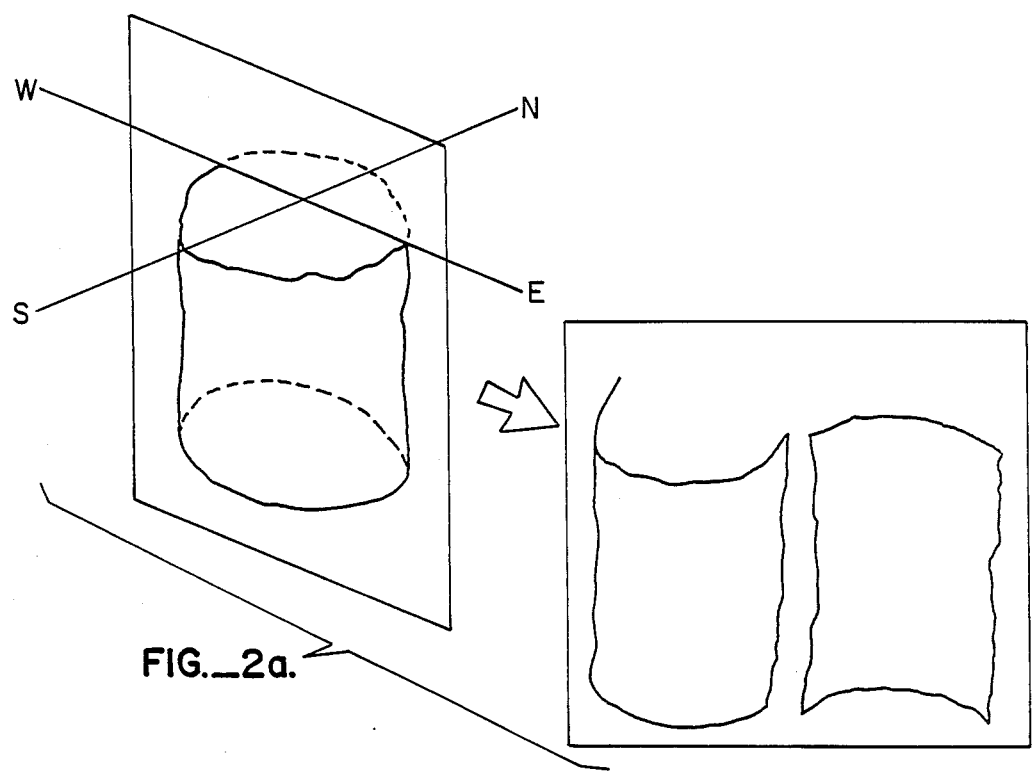
FIG._2a.
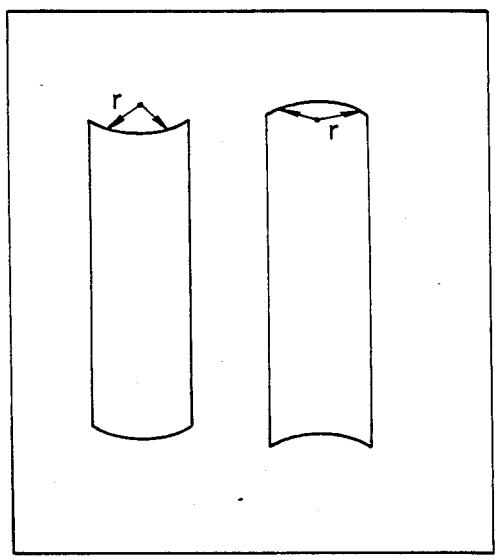
FIG._2b.

FIG._3a.   FIG._3b.

3-D Rotation
Dark – Strong Signal
Light – Weak Signal
0°
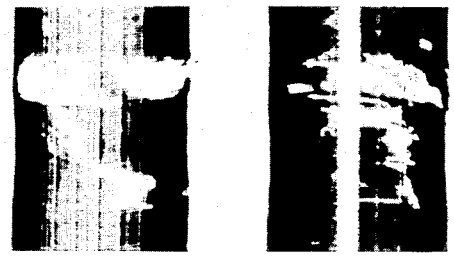
FIG._4a.
30°
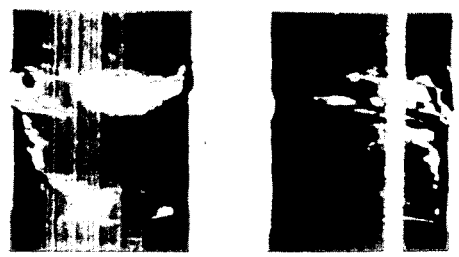
FIG._4b.
60°
FIG._4c.
90°
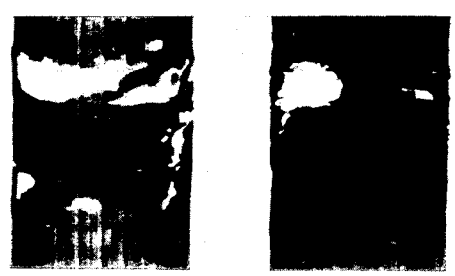
FIG._4d.

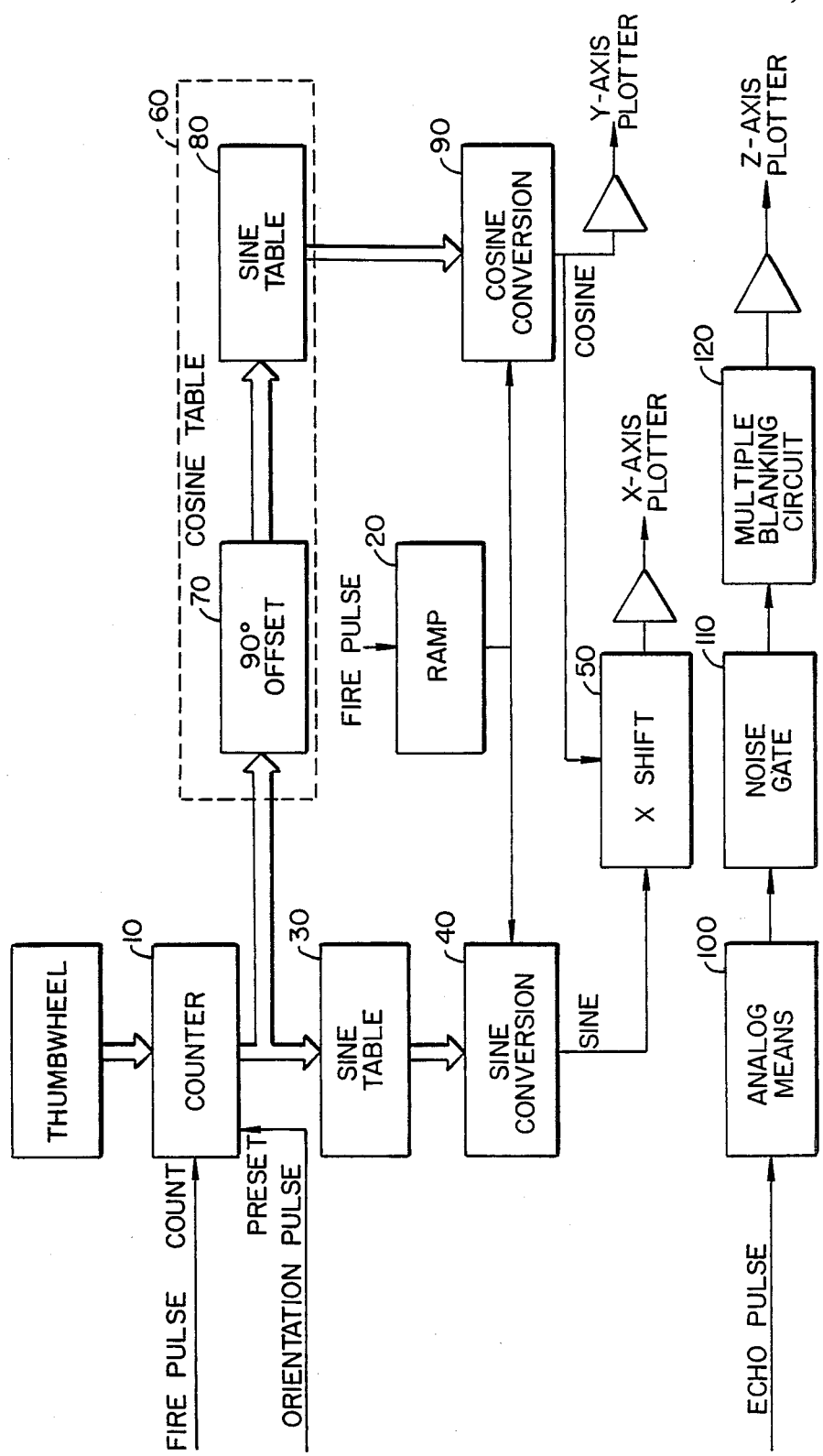
FIG._5.

4,847,814

THREE-DIMENSIONAL BOREHOLE TELEVIEWER DISPLAY

BACKGROUND OF THE INVENTION

The borehole televiewer is a tool which records a circumferential "picture" of the borehole wall through the use of a rotating acoustic transducer. Each scan of the borehole porduces an orientation pulse and a series of signals. The orientation pulse is related to a geographic direction (usually north). The series of signals includes a fire pulse and echo signals whose amplitude and transit time to a receiver are related to the condition of the borehole wall. A sonic pulse fired from the transducer (the fire pulse) travels through the drilling mud until it impinges upon the borehole wall. A portion of the energy from the sonic pulse reflects off the wall and returns back to a receiver via the same path (the echo signal). This energy produces a voltage that is amplified, sent uphole, and is recorded.

Conventional two-dimensional images processed from the borehole televiewer are either two-dimensional amplitude images in which the shading of the plot depends on the amplitude of the reflected signal (see FIG. 1a) or two-dimensional transit time images in which the shading of the plot depends on the transit time of the reflected signal (see FIG. 1b).

SUMMARY OF THE INVENTION

The present invention is a system for creating a three-dimensional image of data obtained from a borehole televiewer. The present invention uses both the transit time values and the amplitude values in a single plot, Transit time values modulate the geometry of the three-dimensional image, providing an outline of the borehole. The amplitude values control the gray scale shading of the image.

The system of the present invention comprises:
(a) a counting means to keep track of the angular position of the transducer,
(b) a ramp generating means to produce a ramp voltage proportional to the elapsed time since the fire pulse,
(c) a sine table means to produce a number corresponding to the sine of the angular position of the transducer,
(d) a sine conversion means to produce a sine signal proportional in amplitude to the ramp voltage,
(e) a cosine table means to produce a number corresponding to the cosine of the angular position of the transducer.
(f) a cosine conversion means to produce a cosine signal proportional in amplitude to the ramp voltage, and
(g) a monitoring means to display points on the monitoring means when the echo signals are received by the receiver.

The counting means keeps track of the angular position of the transducer by counting the fire pulses. It is reset by the orientation pulse.

The ramp generating means produces a ramp voltage proportional to the elapsed time since the fire pulse. It is reset by each fire pulse.

The sine table means is coupled to the counting means, and the sine conversion means is coupled to the sine table means and the ramp generating means. The sine table means translates the contents of the counting means into a number corresponding to the sine of the angular position of the transducer, then the sine conversion means converts this number to an analog value and multiplies this analog voltage by the ramp voltage to produce the sine signal proportional in amplitude to the ramp voltage.

The cosine table means is coupled to the counting means, and the cosine conversion means is coupled to the cosine table means and the ramp generating means. The cosine table means translates the contents of the counting means into a number corresponding to the cosine of the angular position of the transducer, then the cosine conversion means converts this number to an analog voltage and multiplies this analog voltage by the ramp voltage to produce a cosine signal proportional in amplitude to the ramp voltage.

The monitoring means is coupled to the sine conversion means, the cosine conversion means, and the receiver. It displays points when the echo signals are received by the receiver. The position of the points are moved radially from the center of a circle in a direction controlled by the since and cosine signals. The intensities of the points are proportional to the amplitudes of the echo signals.

Preferably, the intensities of the points are inversely proportional to the amplitudes of the echo signals, and the center of the circle is shifted vertically with each scan. Also, preferably, the echo signals from the receivers are conditioned by analog means, are passed through a noise gate means, and are passed through a multiple blanking circuit means prior to being coupled with the monitoring means.

BRIEF DESCRIPTION OF THE DRAWING

FIG. 1a is a two-dimensional amplitude image of a borehole.

FIG. 1b is a corresponding two-dimensional transit time image.

FIG. 2a is a diagram of the formation of a three-dimensional perspective image.

FIG. 2b is a diagram of the format of a plotted three-dimensional perspective image.

FIGS. 3a and 3b are a three-dimensional amplitude/transit time images of a borehole.

FIGS. 4a and 4d are other three-dimensional amplitude/transit time images of a borehole.

FIG. 5 is a circuit diagram of one embodiment of the present invention.

DETAILED DESCRIPTION OF THE PREFERRED EMBODIMENTS

In its broadest aspect the present invention involves a system for creating a three-dimensional image of data obtained from a borehole televiewer. That system uses the transit time values of the echo signals to modulate the geometry of the three-dimensional image to provide an outline of the borehole, and uses the amplitude values of the echo signals to control the gray scale shading of the image.

In one embodiment, this system comprises:
(a) a counting means,
(b) a ramp generating means,
(c) a sine table means,
(d) a sine coversion means,
(e) a cosine table means,
(f) a cosine conversion means, and
(g) a monitoring means.

The circuit used to create the three-dimensional image is an analog/digital hybrid. On a CRT, it simulates the location of the ultrasonic pulse emitted by the transducer in X/Y space and positions the beam of a CRT to correspond with the location of the pulse. The amplitude of the echo is then used to modulate the intensity (Z-axis) of the beam. On a CRT-plotter, it simulates the location of the ultraonic pulse emitted by the transducer in X/Y space and positions the beam of the CRT to correspond with the location of the pulse. The amplitude of the echo is then used to modulate the intensity of the beam, placing a mark on the light-sensitive paper of the plotter.

Data is obtained from scanning a borehole wall at different depths with an acoustic transducer, each scan of the borehole producing an orientation pulse related to a geographic direction and a series of signals, including a fire pulse and echo signals whose amplitudes and transit times to a receiver are related to the condition of the borehole wall.

A counting means keeps track of the angular position of the transducer by counting the fire pulses. The counting means is preset to a number corresponding to the desired rotation of the image, which can be input from a thumbwheel switch. An example of a counting means that can be used in the present invention is the integrated circit CD 4516. Since each count represents 0.86 degrees of transducer rotation of the image, a variable divider allows the normalize the fire pulse frequency of tools which deviate from the standard. The counting means is preset by the orientation pulse to the number input from the thumbwheel switch.

Each fire pulse starts the ramp generating means to produce a ramp voltage proportional to the elapsed time since the fire pulse. An example of a ramp generating means that can be used in the present invention is the integrated circuit LF 347.

A sine table means is coupled to the counting means. An example of a sine table means that can be used in the present invention is the integrated circuit 2716 EPROM. The sine table means translates the contents of the counting means into a number corresponding to the sine of the angular position of the transducer.

A sine conversion means is coupled to the sine table means and the ramp generating means. The sine conversion means does two things. First, it converts the number from the sine table means to a analog voltage. Second, it multiplies that analog voltage by the ramp voltage to produce a sine signal proportional in amplitude to the ramp voltage. That sine signal will control the X-axis of the monitoring means. An example of a sine conversion means that can be used in the present invention is the integrated circuit AD 7541.

A cosine table means is coupled to the counting means. This cosine table means can be a 90 degree offset and a second sine table means. An example of a 90 degree offset that can be used in the present invention is the integrated circuit CD 4008.

The second sine table means can be identical to the sine table means discussed above. The cosine table means translates the contents of the counting means into a number corresponding to the cosine of the angular position of the transducer.

A cosine conversion means is coupled to the cosine table means and the ramp generating means. This cosine conversion means can be identical to the sine conversion means disussed above. The cosine conversion means does two things. First, it converts the number from the cosine table means to a second analog voltage. Second, it multiplies that second analog voltage by the ramp voltage to produce a cosine signal proportional in amplitude to the ramp voltage. That cosine signal will control the Y- axis of the monitoring means.

Analog conditioning of the echo signal is required in order to produce a clean image of the borehole wall. An example of an analog conditioning means that can be used in the present invention is the integrated circuit LF 347. A noise gate means is set to eliminate noise superimposed on the signal before the arrival of the echo. An example of a noise gate means that can be used in the present invention is the integrated circuit CD 4528. A multiple blanking circuit means prevents secondary arrivals from appearing on the plot. An example of a multiple blanking circuit means that can be used in the present invention is the integrated circuit CD 4528/4066.

A monitoring means is coupled to the sine conversion means, the cosine conversion means, and the receiver. The monitoring means displays points on the monitoring means when the echo signals are received by the receiver. The positions of the points are moved radially from the center of a circle in a direction controlled by the sine and cosine signals. The intensities of the points are proportional to the amplitudes of the echo signals. Preferably the intensities of the points are proportional inversely to the amplitudes of the echo signals.

When the monitoring means is a plotter, a continuous image of the borehole wall is produced by incrementally moving the paper after each scan. When the monitoring menas is a CRT, a continuous image of the borehole was is procduced by shifting the center of the circle vertically with each scan. Front and back side of the borehole are plotted side by side by shifting the sine signal in the X-direction when the cosine signal is positive. The tilt of the image can be changed with the Y-axis gain control.

FIG. 2a illustrates the format of the three-dimensional image for 0 degrees of rotation. Transit time values modulate the geometry of the three-dimensional image, providing an outline of the borehole. The amplitude values control the gray scale shading of the plot. To avoid the problem of hidden lines, the borehole is presented as two halves, each representing a 180 degree section. This format is produced by splitting the borehole vertically through the center and showing the front half on the left and the back half on the right. Both halves are then tilted toward the observer to improve the depth perspective of the image. This gives a perspective view from the outside of the front half of the borehole and from the back half of the inside of the borehole.

The convention used to shade the three-dimensional perspective image is reversed from that of the two-dimensional formats. Here, darker shades of gray are assigned to higher amplitude values, and lower values are therefore lighter. The adoption of this convention is a result of the relatively large mean signal amplitude of the reflected waveforms. As low amplitude events tend to be somewhat anomalous, usually representing geometric irregularities, it is desirable to highlight them in some fashion. Since the mean amplitude values are relatively large, the majority of the three-dimensional image will be outlined by darker gray shades. Where low amplitudes occur, the plot will be light, drawing immediate attention to these areas.

Transit time values modulate the geometry of the three-dimensional image by causing the changes in the pixel positions. A smooth uniform borehole could be represented by the three-dimensional image shown in FIG. 2b. Uniform time values will produce an image with smooth geometrical features. Variations in transit time will result in deviations away from the smooth traces of FIG. 2b, where longer times will produce longer values of r, thereby representing the actual geometric changes in the borehole.

FIG. 3 shows an example of a three-dimensional perspective image, again over the same interval as the two-dimensional images of FIGS. 1a and 1b. Note on the edges of the three-dimensional image how the areas pointed out in the two-dimensional images are represented as geometric deviations in the borehole. Moreover, observe the high correlation between the geometric deviations and low amplitude values on the three-dimensional perspective image. The rough surfaces in the geometrically irregular areas reflect very little energy back to the tool sensor, as discussed above. FIG. 4 illustrates the main advantage of the three-dimensional presentation, its ability to draw immediate attention to geometrically anomalous areas in the borehole.

FIG. 4 shows another feature of the three-dimensional image presentation. Images may be rotated to gain a better perspective of edge features. In FIG. 4, it can be seen that the light areas in the middle of the plot are geometric irregularities, analogous to the edge features.

FIG. 5 shows the circuit diagram of one embodiment of the present invention. That embodiment creates a three-dimensional image on a plotter from data obtained from a borehole televiewer. That data includes an orientation pulse related to a geographic direction and a series of signals, including a fire pulse and echo signals whose and transit time to a receiver are related to the condition of the borehole wall. In that three-dimensional image, the X-axis and Y-axis of the plotter are controlled by the fire pulses and the orientation pulse, and the point intensity is controlled by the echo signals.

In the embodiment shown in FIG. 5, the fire pulses and the orientation pulse are sent to a counting means 10 that is used to keep track of the angular position of the borehole transducer by counting the fire pulses. The counting means 10 is preset by the orientation pulse. The fire pulses are also sent to a ramp generating means 20 that is used to generate a ramp voltage proportional to the elapsed time since the fire pulse. The ramp generating means 20 is reset by each fire pulse.

Coupled to the counting means 10 is a sine table means 30 that is used to translate the contents of the counting means 10 into a number corresponding to the sine of the angular position of the transducer. That number is then converted to an analog voltage, and the analog voltage is multiplied by the ramp voltage to produce a sine signal proportional in amplitude to the ramp voltage. This digital to analog conversion and multiplication occur in the sine conversion means 40, which is coupled to both the sine table means 30 and the ramp generating means 20. The sine signal (after it has been shifted in the sine shifting means 50) controls the X-axis of the plotter.

Also coupled to the counting means 10 is a cosine table means 60 that comprises a 90 degree offset 70 and a second sine table means 80. This cosine table means 60 is used to translate the contents of the counting means into a number corresponding to the cosine of the angular position of the transducer. That number is then converted to an analog voltage, and the analog voltage is multiplied by the ramp voltage to produce a cosine signal proportional in amplitude to the ramp voltage. This digital to analog conversion and multiplication occur in the cosine conversion means 90, which is coupled to both the cosine table means 60 and the ramp generating means 20. The cosine signal controls the Y-axis of the plotter. Also, the cosine signal is sent to the sine shifting means 50 to shift the sine signal when the cosine signal is positive.

The monitoring means is a CRT-plotter (not shown) coupled to the sine conversion means 40 and the cosine conversion means 90. The position of the beam of the plotter is moved radially from the center of a circle in a direction controlled by the sine and cosine signals. The center of the circle is shifted vertically with each scan, which is accomplished by incrementally moving the paper between scans. Because the sine signal is shifted when the cosine signal is positive, the resulting image plots the front and back side of the borehole side by side.

The darkness of the plotted point is proportional inversely to the amplitude of the modified echo signal. Besides being coupled to the sine conversion means 40 and the cosine conversion means 90, the plotter is also coupled with the receiver (also not shown) to display a point on the monitoring means when the echo signal is received by the receiver. The echo signal from the receiver is conditioned by analog means 100, is passed through noise gate means 110, and is passed through multiple blanking circuit means 120 prior to being coupled with the monitoring means.

While the system has been described with reference to particularly preferred embodiments, modifications which would be obvious to the ordinary skilled artisan are contemplated to be within the scope of this invention.

What is claimed is:

1. A method for creating a three-dimensional image of data obtained from scanning a borehole wall at different depths with an acoustic transducer, each scan producing an orientation pulse and a series of signals, including a fire pulse and echo signals, wherein the amplitudes of the echo signals and transit times of the echo signals are related to the condition of the borehole wall, the method comprising
   displaying points to create an image when the echo signals are received,
   using the transit times of the echo signals to modulate the geometry of the image to make that image three-dimensional, and
   using the amplitudes of the echo signals to control the gray scale shading of the three-dimensional image.

2. A system for creating a three-dimensional image of data obtained from scanning a borehole wall at different depths with an acoustic transducer, each scan producing an orientation pulse and a series of signals, including a fire pulse and echo signals, wherein the amplitudes of the echo signals and transit times of the echo signals to a receiver are related to the condition of the borehole wall, the system comprising:
   (a) a counting means to keep track of the angular position of the transducer by counting the fire pulses, wherein the counting means is preset by the orientation pulse;
   (b) a ramp generating means, wherein each fire pulse starts the ramp generating means to produce a ramp voltage proportional to the elapsed time since the fire pulse;

(c) a sine table means coupled to the counting means to translate the contents of the counting means into a number corresponding to the sine of the angular position of the transducer;

(d) a sine conversion means coupled to the sine table means and the ramp generating means to convert the number of item (c) to an analog voltage and to multiply that analog value by the ramp voltage to produce a sine signal proportional in amplitude to the ramp voltage;

(e) a cosine table means coupled to the counting means to translate the contents of the counting means into a number corresponding to the cosine of the angular position of the transducer;

(f) a cosine conversion means coupled to the cosine table means and the ramp generating means to convert the number of step (e) to a second analog voltage and to multiply that second analog voltage by the ramp voltage to produce a cosine signal proportional in amplitude to the ramp voltage; and (g) a monitoring means coupled to the sine conversion means, the cosine conversion means, and the receiver to display points on the monitoring means when the echo signals are received by the receiver, wherein the positions of the points are moved radially from the center of a circle in a direction controlled by the sine and cosine signals, and wherein the intensities of the points are proportional to the amplitudes of the echo signals.

3. A system for creating a three-dimensional image according to claim 2 wherein the intensities of the points are inversely proportional to the amplitudes of the echo signals.

4. A system for creating a three-dimensional image according to claim 2 wherein the center of the circle is shifted vertically with each scan.

5. A system for creating a three-dimensional image according to claim 2 wherein the echo signals are conditioned by analog means prior to being coupled with the monitoring means.

6. A system for creating a three-dimensional image according to claim 2 wherein the echo signals are passed through a noise gate means prior to being coupled with the monitoring means.

7. A system for creating a three-dimensional image according to claim 2 wherein the echo signals are passed through a multiple blanking circuit means prior to being coupled with the monitoring means.

8. A system for creating a three-dimensional image according to claim 2 wherein the sine signal of item (d) is shifted when the cosine signal is positive.

* * * * *

UNITED STATES PATENT AND TRADEMARK OFFICE
CERTIFICATE OF CORRECTION

PATENT NO. : 4,847,814

DATED : July 11, 1989

INVENTOR(S) : Jorg A. Angehrn

It is certified that error appears in the above—identified patent and that said Letters Patent is hereby corrected as shown below: On the title page:

Abstract, Line 14, "porportional" should read
--proportional--

Claim 2, Col. 7, Line 10, "analog value by" should read
--analog voltage by--

Signed and Sealed this

Eighth Day of May, 1990

Attest:

HARRY F. MANBECK, JR.

*Attesting Officer*     *Commissioner of Patents and Trademarks*